United States Patent
Kumta et al.

(10) Patent No.: US 12,424,617 B2
(45) Date of Patent: Sep. 23, 2025

(54) ELECTRO-SPUN SULFUR WIRE FOR FABRICATING MATTES OF LITHIUM SULFUR BATTERIES

(71) Applicant: UNIVERSITY OF PITTSBURGH-OF THE COMMONWEALTH SYSTEM OF HIGHER EDUCATION, Pittsburgh, PA (US)

(72) Inventors: Prashant N. Kumta, Pittsburgh, PA (US); Prashanth Jampani Hanumantha, Pittsburgh, PA (US); Bharat Gattu, Pittsburgh, PA (US); Pavithra Murugavel Shanthi, Pittsburgh, PA (US)

(73) Assignee: UNIVERSITY OF PITTSBURGH-OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 199 days.

(21) Appl. No.: 15/555,143

(22) PCT Filed: Mar. 14, 2016

(86) PCT No.: PCT/US2016/022283
§ 371 (c)(1),
(2) Date: Sep. 1, 2017

(87) PCT Pub. No.: WO2016/145429
PCT Pub. Date: Sep. 15, 2016

(65) Prior Publication Data
US 2018/0047978 A1 Feb. 15, 2018

Related U.S. Application Data

(60) Provisional application No. 62/132,014, filed on Mar. 12, 2015.

(51) Int. Cl.
*B32B 27/12* (2006.01)
*C08L 101/00* (2006.01)
(Continued)

(52) U.S. Cl.
CPC .......... *H01M 4/364* (2013.01); *C08L 101/00* (2013.01); *D01D 1/02* (2013.01); *D01D 5/00* (2013.01);
(Continued)

(58) Field of Classification Search
CPC .... D01F 9/08; D01F 6/22; D01F 1/10; H01M 4/36; H01M 4/38; D01D 1/02; D01D 5/34; B32B 27/12
See application file for complete search history.

(56) References Cited

U.S. PATENT DOCUMENTS

2014/0162121 A1* 6/2014 Ryu ...................... H01M 4/362
429/212

FOREIGN PATENT DOCUMENTS

CN 104269538 A 1/2015
EP 2218817 A1 8/2010
(Continued)

OTHER PUBLICATIONS

Ye, Jian et al. Journal of Materials Chemistry A, Feb. 24, 2015, vol. 3, pp. 7406-7412. (Year: 2015).*
(Continued)

*Primary Examiner* — Andrew T Piziali
(74) *Attorney, Agent, or Firm* — Carol A. Marmo; Eckert Seamans Cherin & Mellott, LLC

(57) ABSTRACT

The invention relates to lithium-based battery systems and, more particularly, to electro-spinable solution compositions, electro-spun sulfur-polymer fibers, e.g., wires and yarns, and their use in preparing high performance sulfur mattes, e.g., electrodes, for lithium-sulfur batteries with potential appli-
(Continued)

cations in small-scale mobile devices. The sulfur-polymer fibers have nanoscale dimensions and yarn-like morphology. The sulfur-polymer fibers can be prepared by co-dissolving sulfur and polymer in a solvent for forming the electrospinable solution, and electrospinning the solution. The electrospun fibers can be used to form a composite that includes alternating layers of the electrospun fibers and polymer on a current collector.

5 Claims, 10 Drawing Sheets

(51) Int. Cl.
| | |
|---|---|
| *D01D 1/02* | (2006.01) |
| *D01D 5/00* | (2006.01) |
| *D01D 5/34* | (2006.01) |
| *D01F 1/10* | (2006.01) |
| *D01F 6/22* | (2006.01) |
| *D01F 9/08* | (2006.01) |
| *D04H 1/42* | (2012.01) |
| *D04H 1/728* | (2012.01) |
| *H01M 4/04* | (2006.01) |
| *H01M 4/136* | (2010.01) |
| *H01M 4/137* | (2010.01) |
| *H01M 4/1397* | (2010.01) |
| *H01M 4/1399* | (2010.01) |
| *H01M 4/36* | (2006.01) |
| *H01M 4/38* | (2006.01) |
| *H01M 4/60* | (2006.01) |
| *H01M 10/052* | (2010.01) |
| *H01M 10/0525* | (2010.01) |
| *B82Y 30/00* | (2011.01) |
| *D01F 6/44* | (2006.01) |
| *D01F 6/88* | (2006.01) |
| *H01M 4/02* | (2006.01) |

(52) U.S. Cl.
CPC ............... *D01D 5/003* (2013.01); *D01D 5/34* (2013.01); *D01F 1/10* (2013.01); *D01F 6/22* (2013.01); *D01F 9/08* (2013.01); *D04H 1/42* (2013.01); *D04H 1/728* (2013.01); *H01M 4/0404* (2013.01); *H01M 4/136* (2013.01); *H01M 4/137* (2013.01); *H01M 4/1397* (2013.01); *H01M 4/1399* (2013.01); *H01M 4/366* (2013.01); *H01M 4/38* (2013.01); *H01M 4/602* (2013.01); *H01M 10/052* (2013.01); *H01M 10/0525* (2013.01); *B82Y 30/00* (2013.01); *D01F 6/44* (2013.01); *D01F 6/88* (2013.01); *D10B 2101/00* (2013.01); *D10B 2321/121* (2013.01); *H01M 2004/021* (2013.01); *H01M 2220/30* (2013.01)

(56) References Cited

FOREIGN PATENT DOCUMENTS

| | | |
|---|---|---|
| JP | 2011-222389 A | 11/2011 |
| WO | 2013-130690 A1 | 9/2013 |

OTHER PUBLICATIONS

Embed definition by Merriam-Webster Dictionary (Year: 2022).*
Ye, Jian et al., "Sulfur/carbon nanocomposite-filled polyacrylonitrile nanofibers as a long life and high capacity cathode for lithium-sulfur batteries," Journal of Materials Chemistry A. Feb. 24, 2015 (online), vol. 3., pp. 7406-7412.

* cited by examiner

ELECTRO-SPUN SULFUR WIRE FOR FABRICATING MATTES OF LITHIUM SULFUR BATTERIES

CROSS-REFERENCE TO RELATED APPLICATIONS

This application claims priority under 35 U.S.C. § 119(e) to U.S. Provisional Patent Application Ser. No. 62/132,014, filed Mar. 12, 2015, entitled "Novel Electro-Spun Sulfur Wire for Fabricating Mattes of Lithium-Sulfur Batteries", which is herein incorporated by reference.

GOVERNMENT SUPPORT OR FUNDING

This invention was made with government support under #EE0006825 awarded by the Department of Energy (DOE). The government has certain rights in the invention.

FIELD OF THE INVENTION

The invention relates generally to lithium-based battery systems and, more particularly, to electro-spinable novel compositions leading to (forming) sulfur fibers, e.g., wires, and their use in preparing high performance sulfur mattes, e.g., electrodes, for lithium-sulfur batteries with potential applications in small-scale mobile devices, such as, but not limited to, implementation as textiles.

BACKGROUND

Electronic devices have witnessed rapid downsizing in the last decade. In addition, smart devices are progressively becoming a necessary feature of virtually all mobile applications. It is evidently clear that this evolution will rapidly drive the integration of such devices into a compliant and flexible genre such as textiles, wallpapers and other flexible electronic devices for daily use. The integration of electronic devices into such flexible configurations is currently hampered by the unwieldy and rigid nature of current battery technologies. This aspect has been progressively realized by the battery community of late, and work has been directed towards addressing the same. To this end, research has focused on carbon cloth based flexible electrodes, all solid-state batteries, wearable textile battery, functionalized polymer textile battery and polymer fiber based flexible batteries. The use of conventional Li-ion batteries with loadings as high as ~160 mg/cm$^2$ on the cathode side in tandem with 20 mg/cm$^2$ on the anode side in LiFePO$_4$—Li$_4$Ti$_5$O$_{12}$ systems is evidence of the impetus towards realization of the transition to high energy density cathode-based flexible batteries. However, cathode research has been rather stymied on account of the challenges faced in designing stable, conductive materials with high capacities. Cathode capacities thus far have been limited to ~300 mAh/g for high voltage lithium manganese-nickel-cobalt oxide chemistries. Lithium-sulfur and lithium-air batteries hold significantly more promise of matching anode capacities on account of their high theoretical capacities. The dissolution of sulfur through the formation of soluble polysulfides and the poor electronic conductivity of sulfur are however, major problems associated with Li—S batteries. In addition, particle fracture and delamination as a result of repeated volumetric expansion and contraction have also been identified as factors responsible for their inferior long term performance. The use of highly conductive porous carbon matrix, carbon nanotubes and graphene has previously been demonstrated to help circumvent these limitations. The use of egg-yolk type morphologies employing graphene, manganese oxide and titanium oxide have also been shown to aid in retaining stability and achieving high Columbic efficiency through both polysulfide retention and particle-coating lamination over extended cycling. In addition, the use of a carbon matte serving as a barrier layer to polysulfide transport has been demonstrated to be effective in retaining high capacity.

The use of hollow nanotube and wire morphologies has enabled the realization of high capacity silicon anodes. Core-shell nanowires have also been proven attractive for silicon anodes since the shell can act as a buffer layer to mitigate stresses, limiting the solid electrolyte interphase (SEI) layer formation and also serving as a means for increasing conductivity.

Despite all of the advances made in Li-ion systems, there are still associated therewith various disadvantages including, but not limited to, inherent poor electronic conductivity, volumetric expansion and soluble polysulfide formation, which can result in poor rate capabilities, areal capacity and cyclability.

Thus, there is a need in the art to develop systems and methods to produce Li-ion systems that are capable of exhibiting improved electronic conductivity, rate capability, capacity and cyclability, while reducing soluble polysulfide formation. The present invention includes systems and methods for forming fibers for use in Li-ion systems by electro-spinning novel electro-spinable solution compositions. The fibers produced by conventional electro-spinning techniques are typically in the form of a flat, two-dimensional fiber web or matte and are not substantially flexible or pliable. For use in lithium-sulfur batteries for small-scale applications, it is advantageous for the fibers to exhibit a flexible and pliable morphology. Thus, there is need in the art to develop electro-spinning methods that produce electro-spun sulfur wires that are flexible and pliable, as well as demonstrate high performance, such that they are suitable for use small-scale lithium-sulfur battery applications.

SUMMARY OF THE INVENTION

In one aspect, the invention provides an electro-spinable solution composition including a sulfur component and a polymer component. The polymer component includes a conducting polymer selected from polystyrene, polyaniline, polythiophene, polypyrrole, polyacrylamide, polyvinylidene fluoride, and a family of nitriles, amities, amides, ethers, with function groups selected from oxygen, fluorine, sulfur, selenium, tellurium, phosphorus and nitrogen, and mixtures thereof.

In addition, the polymer component can include graphene. Thus, the polymer component can include a combination of polystyrene and graphene, as well as a mixture of the conducting polymer as above-described with graphene including carbon nanotubes.

A precursor of the sulfur component can be sulfur powder.

In another aspect, the invention provides a sulfur-polymer fiber having nanoscale dimensions and yarn-like morphology, which includes a sulfur component and a polymer component. The sulfur and polymer components of the fiber are interwoven and/or the polymer component encapsulates the sulfur component.

The fiber can have a diameter from a few nanometers to several micrometers. In certain embodiments, the diameter can be from greater than about 100 nanometers to about 10 μm.

The fiber can have a continuous length from a few inches to several feet. In certain embodiments, the length can be from about 12 inches to about 24 inches. The length can depend of a volume of the sulfur component and the polymer component.

The fiber can exhibit a smooth or irregular surface topography.

The sulfur-polymer fiber can be in the form of an electrospun wire or yarn.

In still another aspect, the invention provides a method of preparing sulfur-polymer fiber having nanoscale dimensions and a yarn-like morphology. The method includes obtaining a sulfur component and a polymer component, co-dissolving the sulfur and polymer components in solvent forming a solution, electrospinning the solution, and producing sulfur-polymer electro-spun fiber therefrom.

In certain embodiments, the method can further include depositing one or more layers of the sulfur-polymer electrospun fiber on a current collector, depositing one or more layers of conducting polymer in an alternating configuration with the one or more layers of the sulfur-polymer fibers, and forming a composite. The sulfur-polymer fibers have nanoscale dimensions and yarn-like morphology, and include a sulfur component and a polymer component.

The composite can be in the form of a matte.

The current collector can be composed of aluminum.

The sulfur-containing fiber can be in the form of electrospun wire.

In certain embodiments, the composite can include from three to five layers of each of the sulfur-containing fiber and the conducting polymer.

The composite can be employed as a sulfur electrode for a lithium-based battery.

DETAILED DESCRIPTION OF THE INVENTION

Figure 1:
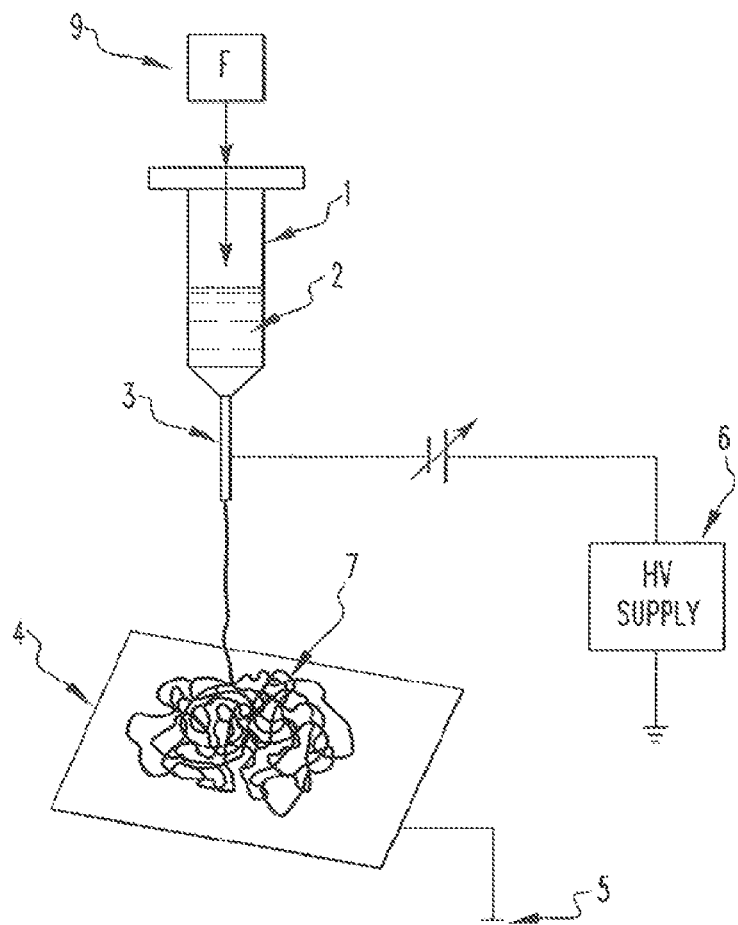
FIG. 1 is a schematic showing an electro-spinning apparatus and method, in accordance with certain embodiments of the invention.

The present invention relates to electro-spinable solution compositions including a sulfur component and a polymer component, which can produce flexible sulfur-polymer fibers having a unique yarn-like morphology; systems and methods for preparing sulfur-polymer solutions for electrospinning to form the flexible sulfur-polymer fibers, and processes for using the flexible sulfur-polymer fibers to form textile-like cathodes. Further, the invention relates to composites formed by depositing the flexible sulfur-polymer fibers and alternating layers of polymer on a current collector. Further more, the invention relates to the sulfur-polymer fibers having a coating, e.g., lithium ion conducting layer, deposited thereon to provide improved cycling stability.

Lithium-sulfur (Li—S) batteries provide energy storage for mobile and stationary applications, primarily due to their very high theoretical energy density attributes. The present invention provides an electro-spinning solution and an electro-spinning method for generating novel sulfur-polymer fibers, e.g., wires, with the ability for the wires to be spun into yarns or woven into mattes or pressed into pellets, to produce yield high performance sulfur-containing electrodes for use in lithium-sulfur batteries.

More particularly, the invention includes electro-spun fibers, such as, electro-spun sulfur wires or yarns, which can have diameters of a few nanometers to several micrometers and, lengths as short as a few inches to as long as several feet (as desired, and dependent on the volume of the spinning solution and the applied potential bias forming a flexible and pliable form). In certain embodiments, the diameter can be from greater than about 100 nanometers to about 10 µm and, the length can be from about 12 inches to about 24 inches. The fibers can have a surface that exhibits a smooth or irregular surface topography depending on the nature of the bias and the viscosity of the spinning solution. The invention also includes use of the fibers, e.g., wires or yarns, in preparing sulfur electrodes, e.g., cathodes, for Li—S batteries. Further, the invention includes electro-spinning techniques involving the novel electro-spinable solutions and methodologies for preparing the electro-spun sulfur wires or yarns. The unique fiber morphology, derived by the electro-spinning methods having the capability of generating the flexible sulfur wires or yarns, provides an opportunity for small-scale mobile device applications, such as, textile batteries. The electro-spinning methods in accordance with the invention also allow for the formation of a polymer-sulfur interface that acts as a physical barrier to liquid lithium electrolyte, facilitating the reduction of polysulfide dissolution, which is a primary deficiency in conventional Li—S batteries. When converted into pellet sulfur electrodes, the flexible sulfur wire materials exhibit very stable capacities. Further, coating the electrodes with an inorganic Li ion conductor results in further improvement of cycling behavior, including stable capacity and low fade rate.

An electro-spinning apparatus and method are illustrated in FIG. 1. As shown in FIG. 1, the electro-spinning apparatus includes a syringe 1 containing a novel polymer molten mass 2 or a novel electro-spinable solution. A spinning capillary 3 is located at the tip of the syringe 1, which is coupled with a pole of the voltage-generating arrangement 6 (current supply). By means of an injection pump 9, the polymer molten mass 2 or a solution is transported out of the syringe 1 towards the spinning capillary 3, where drops are formed at the tip. The surface tension of the drop of the polymer molten mass 2 or solution coming out of the spinning capillary 3 is overcome by means of an electric field between the spinning capillary 3 and a counter electrode 5. The drop injected by the syringe coming out of the spinning capillary 3 deforms and when it reaches a critical electric potential it is drawn to yield a fine filament, the so-called jet. This electrically-charged jet, continuously extracting new polymer molten mass 2 or solution from the spinning capillary 3 is then accelerated in the electric field towards the counter electrode 5. The jet solidifies during its flight towards the counter electrode 5 by means of the evaporation of the solvent or by means of cooling, such that in a short period of time continuous nanofibers 7 are generated, linked with one another, with typical diameters of a few nanometers to several micrometers. The nanofibers 7 can have lengths as short as a few inches to as long as several feet as desired and dictated by the volume of the spinning solution and the applied potential bias forming a flexible and pliable form. As mentioned, the fiber surfaces produced can exhibit a smooth or irregular surface topography depending on the nature of the bias and the viscosity of the spinning solution. These nanofibers 7 are deposited on the template 4 associated with the counter electrode 5 in the form of a web or nonwoven matte. The conductive template 4 serves as a collector and is grounded together with the counter electrode 5. The polymer nanofibers 7 are spun directly on the conductive template 4.

Figure 2:
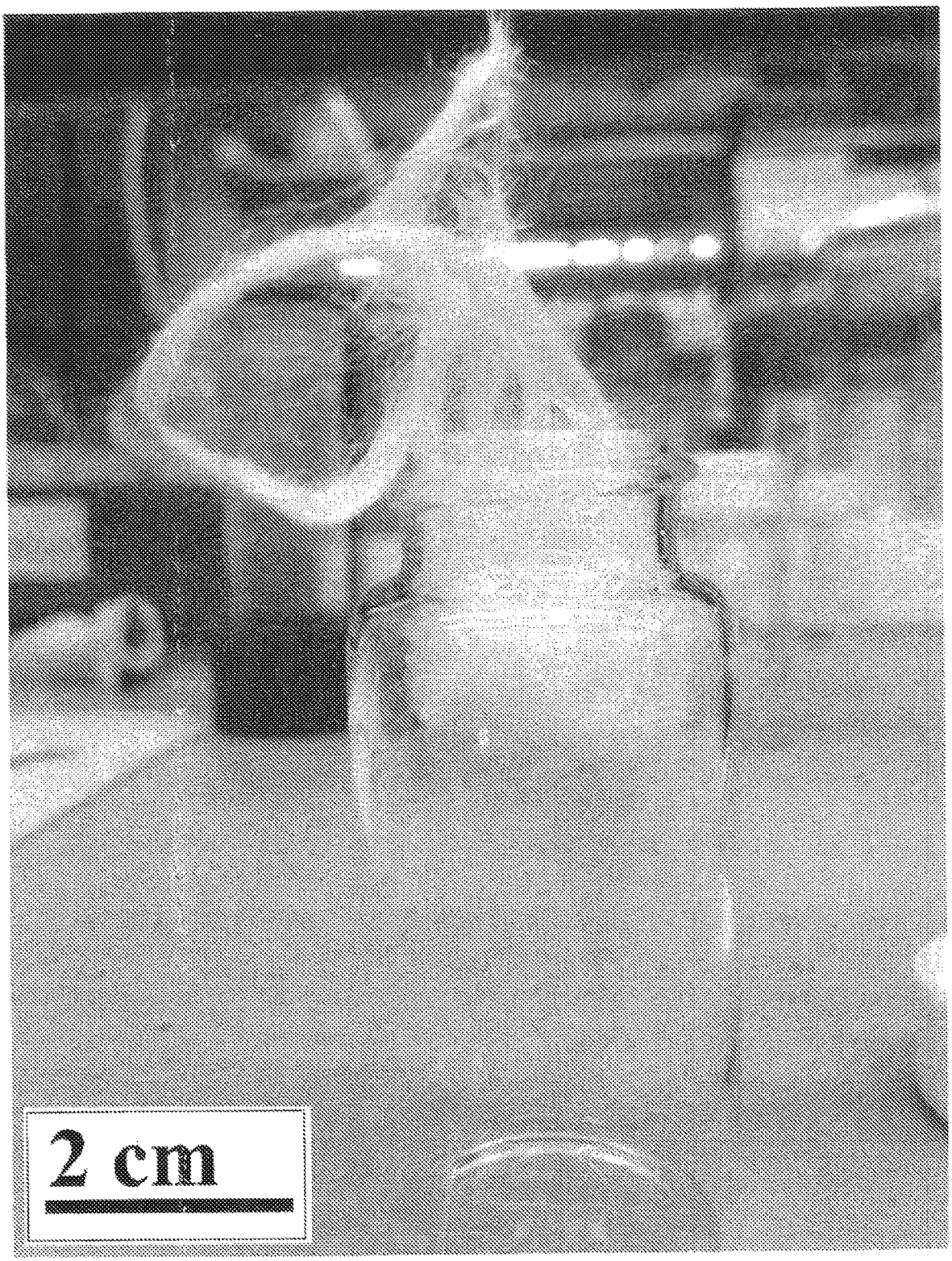
FIG. 2 is a photograph showing the yarn-like nature of electro-spun sulfur wires, in accordance with certain embodiments of the invention.
Figure 3:
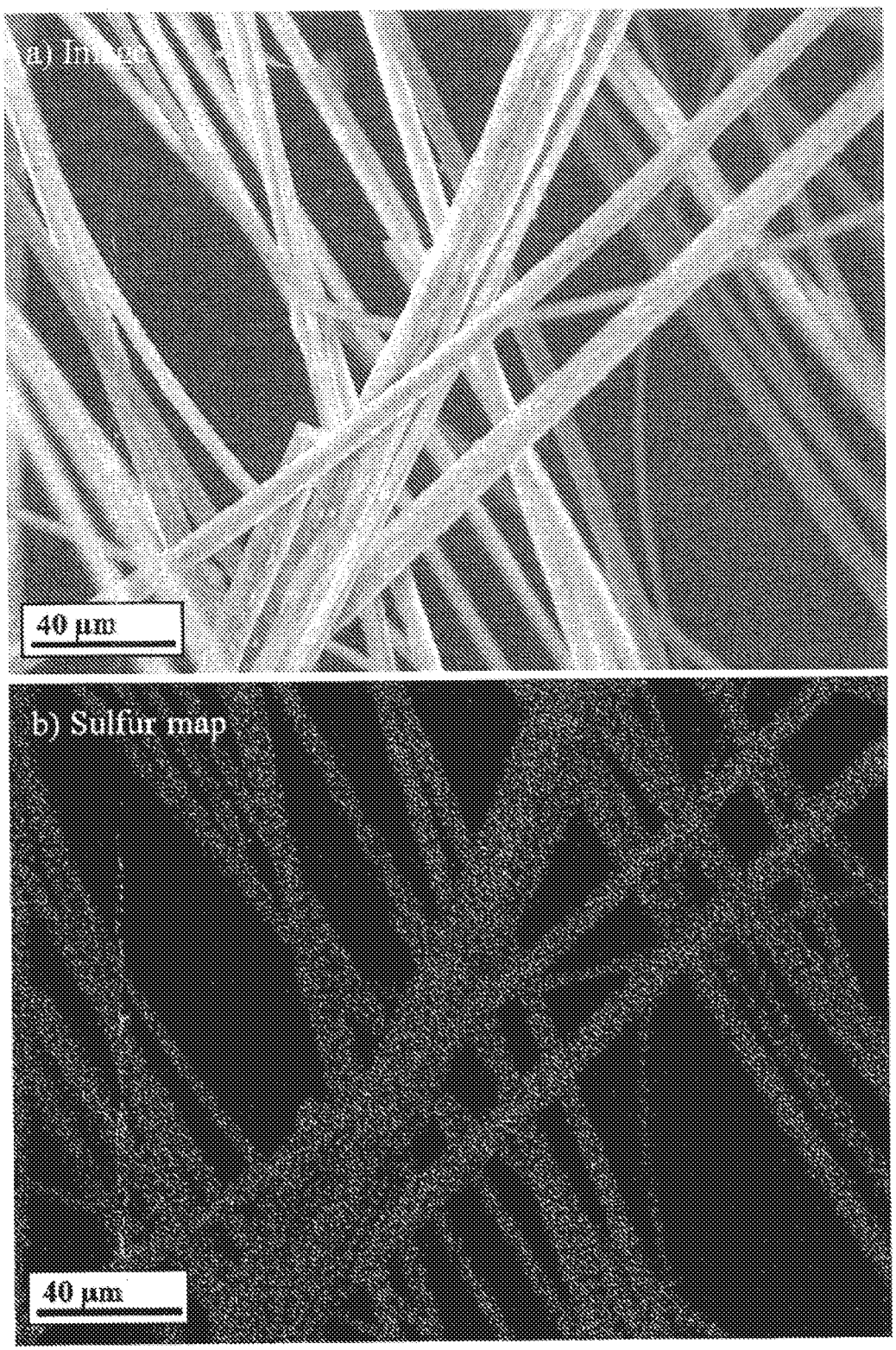
FIG. 3. is a scanning electron microscope (SEM) image and an EDAX map, respectively, of electro-spun sulfur wires, in accordance with certain embodiments of the invention.

FIG. 2 shows electro-spun flexible sulfur wires, in accordance with certain embodiments of the invention. The wires have a pliable morphology and, can be handled and synthesized with ease. The wires are capable of being spun into a yarn and woven directly into textile batteries. FIG. 3 includes a scanning electron micrograph (SEM) and a corresponding sulfur map of the electro-spun flexible sulfur wires shown in FIG. 2. As shown in FIG. 3, the sulfur is uniformly distributed over the length of the yarn with no obvious segregation.

The sulfur-polymer fibers, e.g., wires, are composed of a sulfur component and a polymer component, e.g., precursors. The sulfur and polymer components are co-dissolved in solvent to form a unique electro-spinable solution, and then the solution is electro-spun into the wires or yarns. The sulfur component can be selected from a wide variety of active sulfur compounds known in the art, such as, but not limited to, sulfur powder, nano-sulfur powder, and mixtures thereof. The polymer component can be selected from a wide variety of known polymers. Non-limiting examples of suitable polymers include known conducting polymers, such as, but not limited to, polystyrene such as polyaniline, polythiophene, polypyrrole, polyacrylamide, polyvinylidene fluoride, and others selected from a family of nitriles, amines, amides, and ethers, with functional groups selected from oxygen, fluorine, sulfur, selenium, tellurium, phosphorus and nitrogen, and mixtures thereof. Optionally, graphene can be included in the polymer component. Thus, in certain embodiments, the polymer is a mixture of polymer and graphene, In other embodiments, the polymer is a combination or mixture of polystyrene and graphene, as well as a mixture of other polymers as disclosed above with graphene including carbon nanotubes. In these embodiments, the polymer serves as an electron conducting filler, as well as a current collector, e.g., an embedded current collector. The solvent can be selected from known solvents, such as, but not limited to, carbon disulfide.

In certain embodiments, the sulfur and polymer components can be thoroughly mixed prior to co-dissolution in solvent. Without intending to be bound by any particular theory, it is believed that mixing of the sulfur and polymer components forms a polymer layer.

The amount of the sulfur component can vary and may constitute from about 30 to about 75 percent by weight of the total weight of the solution. The amount of the polymer component can also vary and may constitute from about 25 to about 70 percent by weight of the total weight of the solution.

In certain embodiments, the sulfur-polymer solution can further include other known organic, inorganic or metal materials, and mixtures thereof.

Figure 4:
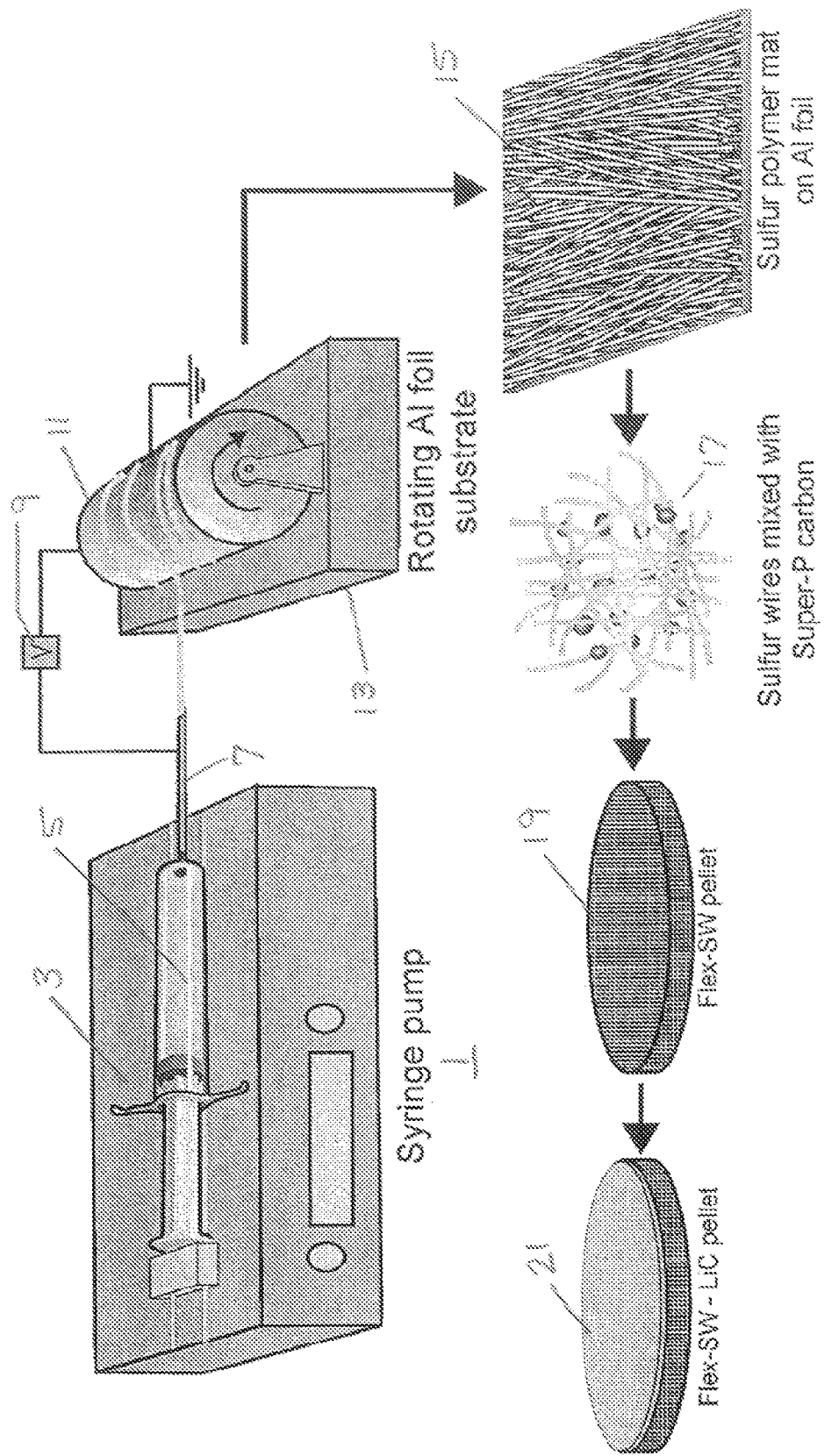
FIG. 4 is a flow diagram showing an electro-spinning apparatus and process, in accordance with certain embodiments of the invention.

The electro-spinning process is typically carried out at ambient temperature and pressure conditions. FIG. 4 is a schematic showing an electro-spinning apparatus and process in accordance with certain embodiments of the invention. As shown in FIG. 4, the apparatus includes a syringe pump 1 and a rotating drum 13. The syringe pump 1 includes a syringe 3 that contains a novel electro-spinable solution 5, which includes the sulfur and polymer selected from the abovementioned components co-dissolved in solvent. A capillary 7 is located at the tip of the syringe 3. The capillary 7 is coupled with a pole of a voltage-generating arrangement 9 (current supply). The rotating drum 13 includes a roller 14. A conductive substrate 11 is positioned onto the roller 14, such that the substrate rotates thereon. The conductive substrate 11 can be selected from materials known in the art, such as, but not limited to aluminum foil. The syringe pump 1 deposits the solution 5 onto the conductive substrate 11 as the roller 14 is rotated. The rotating, conductive substrate 11 serves as a collector and is grounded. The conductive substrate 11 is removed from the rotating drum 13 to form a sulfur-polymer mat 15. As shown in FIG. 4, the sulfur wires are mixed with super-p carbon 17 and formed, e.g., pressed, into a flexible pellet electrode 19. A LIC coating is applied to the flexible pellet electrode 19 to form a coated pellet electrode 21.

The flexible pellet electrode 19 may be used as a standalone electrode for textile batteries with or without the application of the lithium ion conducting coating. The presence of the coating is effective to exhibit one or more of enhanced cycling stability, surface polysulfide entrapment, and reduced initial capacity fade. The lithium ion conducting coating can be composed of various known materials, such as, but not limited to, lithium orthosilicate ($Li_4SiO_4$). For example, the LIC coating can include a thin layer of lithium orthosilicate.

The electro-spun sulfur fibers can be interconnected to form a web or matte, such as, mat 15 shown in FIG. 4. As mentioned, the diameters of the fibers can vary and in certain embodiments, can be from about 10 nanometers to about 100 microns. In certain embodiments, the electro-spun sulfur fibers, e.g., wires, are from 1-7 µm. The individual fibers in the matte, e.g., nonwoven matte, can have a random orientation or can be predominantly oriented in one or more directions.

As described herein, the method of preparing the electro-spun sulfur-polymer fibers results in a polymer interface or layer, such that the electro-spun sulfur-polymer wires are essentially encapsulated with a polymer matrix. When used in electrode applications, the polymer interface provides a physical barrier between the sulfur wires and liquid lithium electrolyte, which prevents dissolution of the polysulfide species. Without intending to be bound by any particular theory, it is believed that the presence of the polymer layer serves as a spatial mesh/screen to retain dissolved polysulfide in close proximity of the electrode, thereby reducing polysulfide dissolution and increasing the probability of conversion to the desired insoluble disulfide species. As a result, sulfur electrodes, e.g., cathodes, exhibit high electronic conductivity, minimal volumetric expansion and improved rate capabilities, and superior cycling ability, as well as the ability to produce electrodes that can obtain high areal capacities.

Further, as described herein, the polymer component can include graphene and therefore, the sulfur wires can be interwoven with polymer/graphene and/or coated with polymer/graphene. In certain embodiments, the graphene serves as an embedded current collector.

Figure 5:
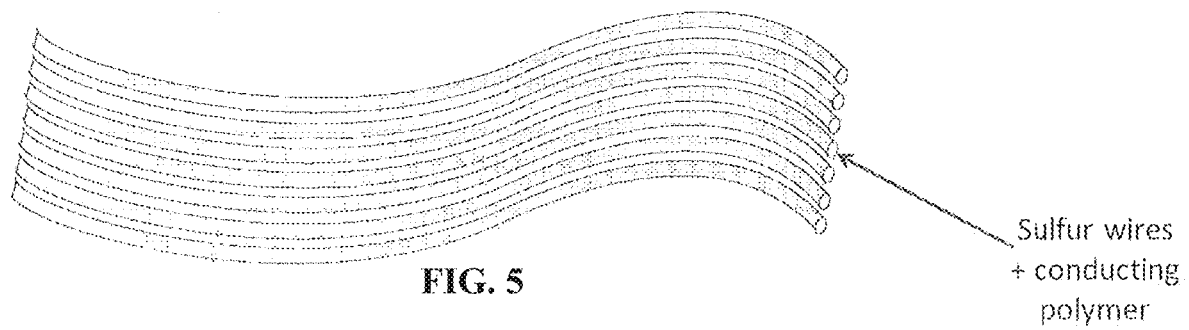
FIG. 5 is a schematic showing sulfur wires consisting of conducting polymer interwoven with sulfur, in accordance with certain embodiments of the invention.
Figure 6:
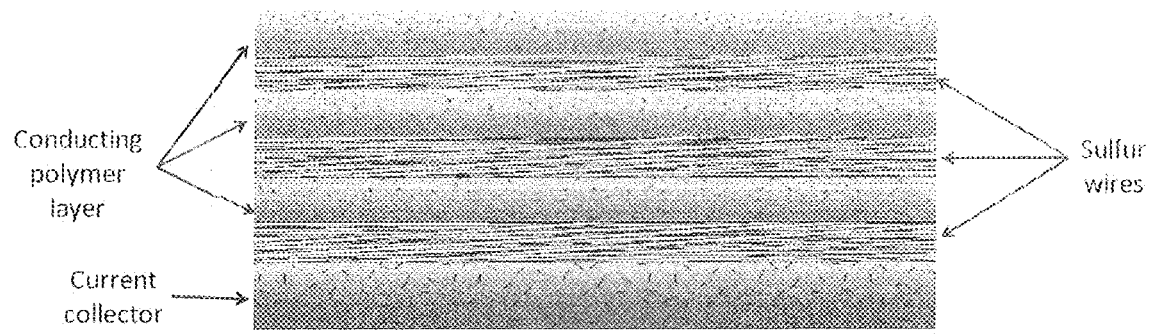
FIG. 6 is a schematic showing a multilayer morphology consisting of sulfur nanowires separated by layers of conducting polymer, in accordance with certain embodiments of the invention.
Figure 7:
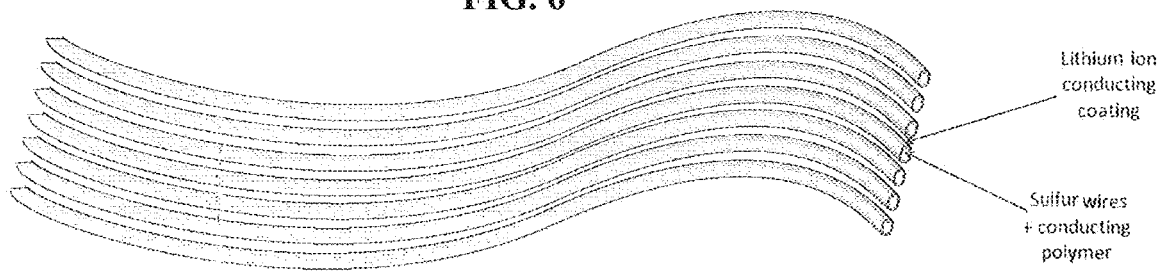
FIG. 7 is a schematic showing core-shell morphology consisting of sulfur-conducting polymer-core and a lithium ion conducting (LIC) coating, in accordance with certain embodiments of the invention.

In accordance with the electro-spinning methods, the resulting electro-spun sulfur fibers, e.g., wires, have a unique morphology amenable for flexible battery applications. FIG. 5 is an image that shows a plurality of sulfur wires and conducting polymer. As described herein, the polymer may be interwoven with the sulfur and/or the polymer may form a layer or coating such that the wires are essentially encapsulated by the polymer. As shown in FIG. 6, the wires can include a composite configuration having a textile-matte-like morphology consisting of layers of sulfur wires and conducting polymer. FIG. 6 is an image showing the textile-like matte wherein a layer of sulfur wires is deposited on a current collector and additional layers or sulfur wires separated by conducting polymer are deposited thereon, e.g., alternating layers of sulfur wires and conducting polymer are deposited, layer-by-layer, onto the current collector. The multilayer composite shown in FIG. 6 has three layers each of sulfur wires and conducting polymer, however, it is understood that more than three or less than three layers can be used. In general, the number of layers is as-needed to conform to the current collector. FIG. 7 is an image that shows the sulfur wires and conducting polymer as shown in FIG. 5, with the addition of a lithium ion conducting coating deposited on the surface of the sulfur-conducting polymer wires.

Mattes of high electronic conductivity can result in superior rate characteristics. In addition, the multilayer morphology of the invention can demonstrate excellent cycling characteristics due to reduced sulfur-liquid electrolyte contact as a result of the conducting polymer layer and, high areal and gravimetric capacities.

In accordance with certain embodiments of the invention, electro-spun sulfur-polymer fiber composites, e.g., mattes, can be prepared as follows:
(i) Co-dissolving sulfur and polymer, wherein suitable polymers include known conducting polymers, such as, but not limited to, polystyrene such as polyaniline, polythiophene, polypyrrole, polyacrylamide, polyvinylidene fluoride, and others selected from a family of nitriles, amines, amides, and ethers, with functional groups selected from oxygen, fluorine, sulfur, selenium, tellurium, phosphorus and nitrogen, and mixtures thereof, in solvent to foils a solution;
(ii) Electro-spinning the solution into wires or yarns, typically having diameters of a few nanometers to several micrometers (e.g., in certain embodiments, from greater than about 100 nanometers to about 10 µm) and, lengths as short as a few inches to as long as several feet (e.g., in certain embodiments, from about 12 inches to about 24 inches, as desired, and dependent on the volume of the spinning solution and the applied potential bias forming a flexible and pliable form); a surface that exhibits a smooth or irregular surface topography depending on the nature of the bias and the viscosity of the spinning solution, and depositing onto a current collector, e.g., aluminum foil; and
(iii) Co-spinning (e.g., layer-by-layer) up to five layers each of sulfur-polymer wire and conducting polymer.

While various embodiments of compositions, methods, and the like have been described, it is not the intention to restrict or in any way limit the scope of the invention to such description. It is, of course, not possible to describe every conceivable combination of ingredients or methodologies for purposes of describing the compositions, methods, and so on described herein. Therefore, the disclosed concept is not limited to the specific details, the representative compositions and methods described. Thus, this application is intended to embrace alterations, modifications, and variations that fall within the scope of the invention.

EXAMPLES

The electrochemical performance of electro-spun wires, prepared in accordance with certain embodiments of the invention, was evaluated. The wires were pressed to form flexible pellets and using electrochemical impedance analysis, the nature and efficacy of the charge-storage in the pellets was analyzed pre- and post-cycling. The chemical nature of the electro-spun wires was compared with that of commercially available sulfur powder and nano-sulfur powder, while relating the electrochemical performance for lithium-sulfur batteries. To further enhance the cycling stability of pellet electrodes, a lithium ion conductor (LIC) coating was applied to the pellets.

Sulfur (325 mesh, 99.5%—Alfa Aesar), polystyrene (Avg. Mw—280000—Sigma Aldrich) and carbon disulfide (ACS reagent—99.9%—Sigma Aldrich). The sulfur and polystyrene were dissolved in 10 ml of the carbon disulfide to form a solution. The solution was electro-spun (using a drum-type electro-spinning apparatus as shown in FIG. 4) at a flow rate of 1.5 ml/h (18 gauge stainless steel needle-Rame-Hart Instrument Company) and a potential of 17.5 kV. Both the sulfur and polystyrene were soluble in the carbon disulfide and a maximum soluble composition of 6:1 (sulfur: polystyrene) was deemed spinnable at room temperature. Sulfur mattes were obtained from the electro-spinning process, dried in vacuum for 12 hours to remove residual solvent and used for electrochemical characterization.

To evaluate the electrochemical performance, the wires were mixed with a conductive carbon additive (super-P, Timcal Graphite & Carbon) in a suitable ratio of 2:1, and pressed into pellets using a 5-ton load in a 1-cm diameter stainless steel die (Carver Inc.) on a Carver press (Carver Inc.). The pellets were labeled "Flex-SW pellets". The following three materials were used for comparison: (a) commercial sulfur slurry (325 mesh, 99.5%—Alfa Aesar) cast using N-methyl pyrolidone (Sulfur:super-P carbon: PVDF=45:45:10) labeled "C-Sulfur slurry"; (b) commercial sulfur pellets labeled "C-Sulfur pellet"; and (c) a multilayer composite electrode consisting of LIC coated on top of a nano sulfur-carbon pellet labeled "nano-sulfur-LIC pellet". To evaluate the Flex-SW pellets with an LIC coating, the Flex-SW pellet material was pressed with a thin layer of lithium orthosilicate used as an LIC, labeled "Flex-SW-LIC pellet".

The sulfur materials were characterized by x-ray diffraction (XRD) using Philips XPERT PRO system employing $CuK_\alpha$ ($\lambda=0.15406$ nm) radiation with operating voltage and current set at 45 kV and 40 mA, respectively to perform qualitative phase analysis. The XRD peak profile was analyzed using the Pseudo-Voigt function to determine the Lorentzian and Gaussian contribution of the peaks. The integral breadth of the Lorentzian contribution, determined from peak profile analysis using single line approximation method after eliminating the instrumental broadening and lattice strain contribution, was implemented to calculate the lattice parameter and molar volume of the powder samples using least square refinement techniques. Scanning electron microscopy (SEM) was conducted to investigate the microstructure of the sulfur fiber Flex-SWs. Elemental mapping was performed using the energy dispersive X-ray spectroscopy (EDAX) analyzer integrated into the SEM machine. Philips XL-30FEG equipped with an EDAX detector system comprised of an ultrathin beryllium window and Si (Li) detector operating at 20 kV was employed for executing the secondary electron (SE) image and elemental analyses. X-ray photo electron spectroscopy (XPS) was performed on a Thermo Scientific ESCALAB 250Xi X-ray photoelectron spectrometer (S) to analyze the surface composition and determine the valence state of Sulfur in the Flex-SW materials. The system was calibrated in accordance with the manufacturer's procedures utilizing the photoemission lines, $E_b$ of $Cu_{2p}^{3/2}$-932.7 eV, $E_b$ of $Au_{4f}^{7/2}$-84 eV and $E_b$ of $Ag_{3d}^{5/2}$-368.3 for a magnesium anode. All the reported intensities are in effect experimentally determined peak areas divided by the instrumental sensitivity factors.

2025 type coin cells were assembled using the different sulfur electrodes as the working electrode employing lithium as the counter/reference electrode and lithium trifluoromethanesulfonate [1.8M $LiCF_3SO_3$ in 1,3 dioxolane and 1,2 dimethoxyethane (1:1 by vol.) combined with 0.1 M $LiNO_3$] as the electrolyte. All the cells tested in this study were cycled at room temperature (~298 K) within 1.7-2.6 V (with respect to the lithium counter/reference electrode) employing the discharge/charge rates of ~50-3000 $\mu A/cm^2$ using a multichannel battery testing system (Arbin BT2000 instrument). The gravimetric capacity (mAh/g), calculated on the basis of sulfur loading have been assessed and reported herein. In addition to the gravimetric capacity, the specific capacity of the Flex-SW-pellet cathode materials has been reported as an areal capacity ($mAh/cm^2$) which has been calculated using the area of the electrodes respectively. To further evaluate and obtain an in-sight into the charge storage characteristics of the Flex-SW-pellet and Flex-SW-LIC-pellet electrodes, electrochemical impedance spectroscopy (EIS) was performed on the Versastat 3 over a frequency range of 1 Hz-100 KHz. An A.C. amplitude of 5 mV was used and the spectra were obtained between open circuit potential and 1.7 V (with respect to lithium counter/reference) at intervals of 100 mV during $1^{st}$ discharge. In addition, EIS was performed on the electrodes post-cycling to understand any degradation mechanisms involved therein. The Z-View (Scribner Associates, Inc.; version 3.3c) software was used to design the equivalent circuit model of the impedance spectra.

Figure 8:
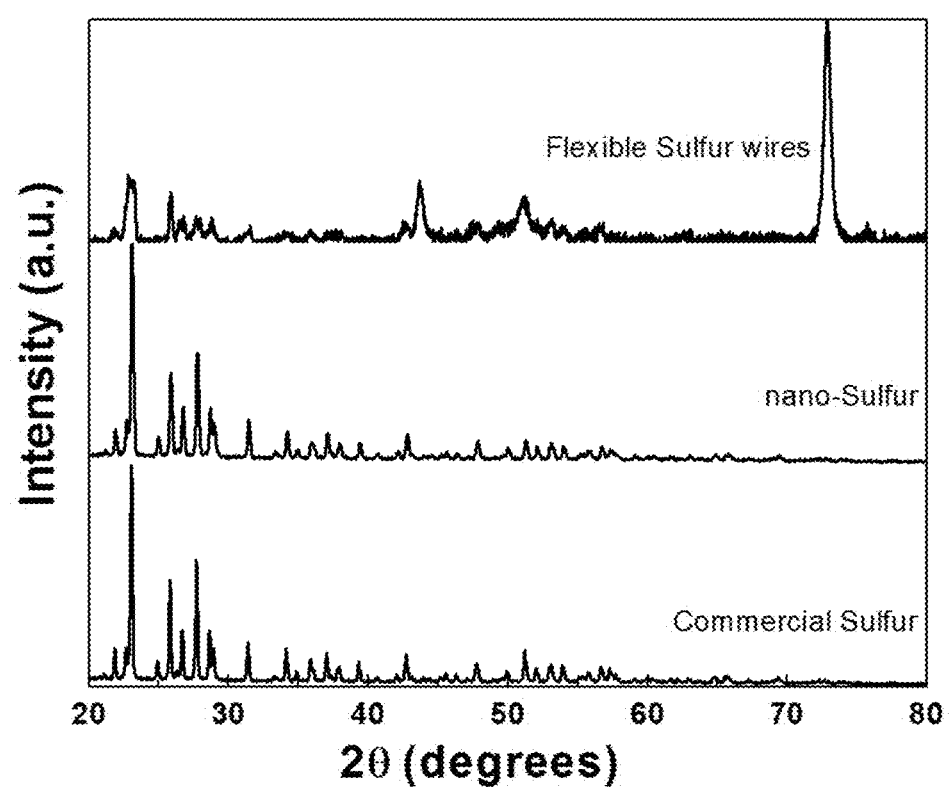
FIG. 8 is an XRD pattern of flexible sulfur-polymer wires, in accordance with certain embodiments of the invention, and comparison with other known sulfur materials.

FIG. 8 is a plot of the x-ray diffraction (XRD) patterns of commercial sulfur, nano-sulfur and the Flex-SWs. As shown in FIG. 8, the XRD pattern of the Flex SWs matches closely with that of orthorhombic sulfur (PDF 00-042-1278) and commercially procured sulfur (~325 mesh, Sigma Aldrich, Inc., 99% wt.). The absence of any impurity phase barring carbon can be clearly inferred from the XRD pattern. The nano-sulfur particles formed by the chemical re-precipitation procedure have agglomerated particle sizes of ~500 nm-2 µm while commercially obtained sulfur particles have a wide particle size distribution consisting of 20-150 micron particles.

Figure 9:
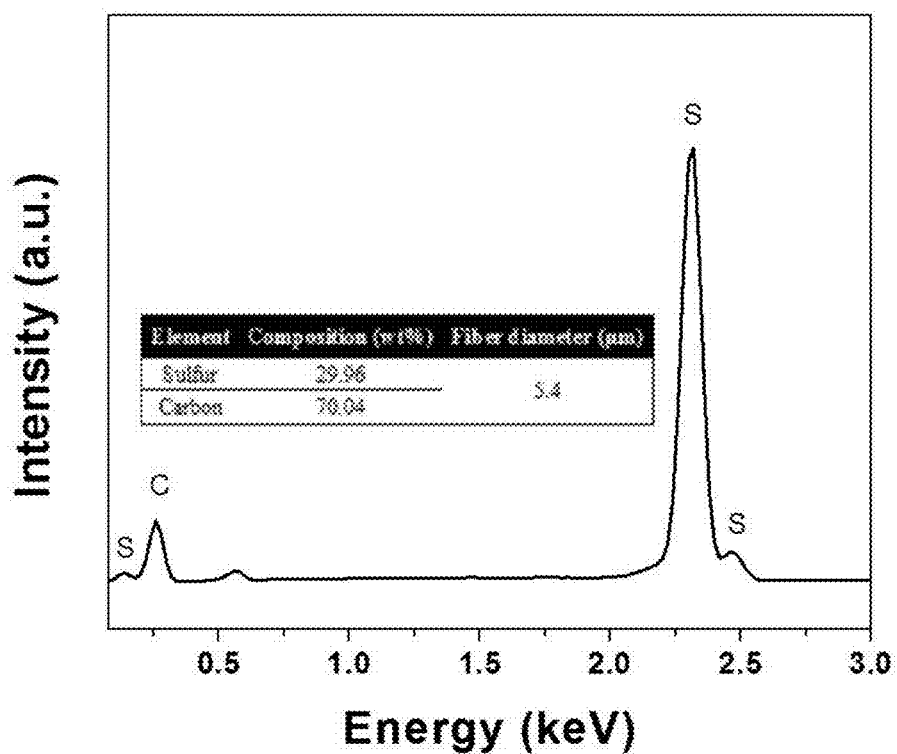
FIG. 9 is an EDAX spectrum of flexible sulfur-polymer wires, in accordance with certain embodiments of the invention.

FIG. 9 is an EDAX spectrum that shows the presence of sulfur and carbon corresponding to the precursor polystyrene and sulfur, which were dissolved in the carbon disulfide, with no other impurities. Sulfur was present in an amount of 29.96 wt. % and carbon amounted to 70.04 wt. %. the fiber diameter was 5.4 µm.

Figure 10:
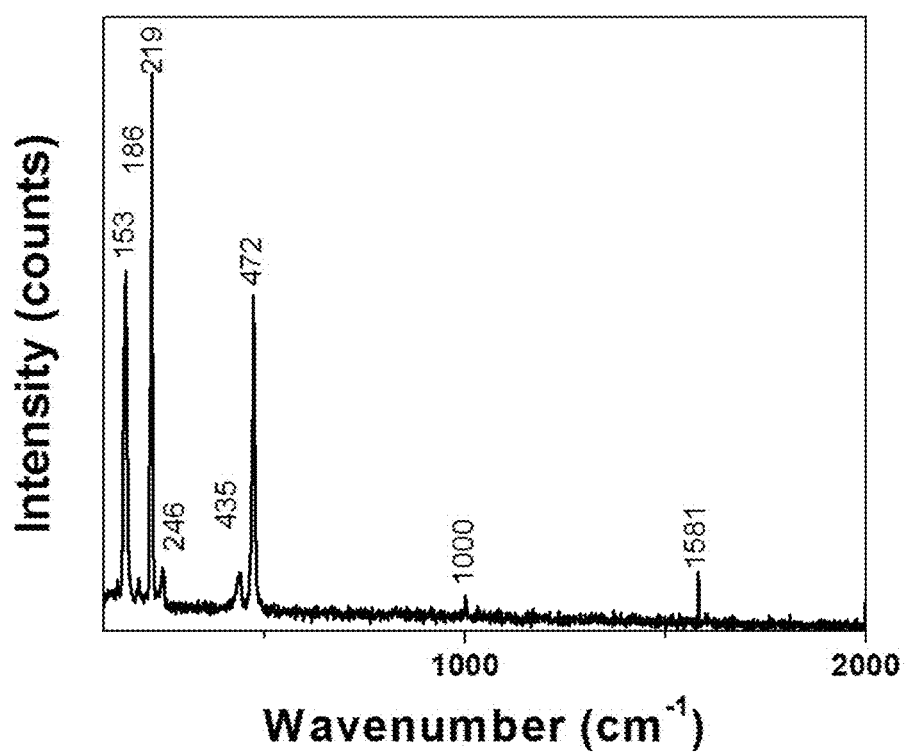
FIG. 10 is a raman spectrum of flexible sulfur wires, in accordance with certain embodiments of the invention.

FIG. 10 is a raman spectroscopy that confirms the formation of rhombic sulfur as well as the existence of polystyrene species. Further, FIG. 10 and. Table S1 below confirm the vibrational frequencies corresponding to those of rhombic sulfur and polystyrene.

TABLE S1

Peak positions observed in Raman spectrum of Flex - SWs and corresponding vibrations.

| Observed ($cm^{-1}$) | Literature ($cm^{-1}$) | Vibration |
|---|---|---|
| 153 | 151 | Rhombic Sulfur $S_8$ ($E_2$ symmetry species) |
| 186 | 186 | Rhombic Sulfur $S_8$ ($E_1$ symmetry species) |
| 219 | 218 | Rhombic Sulfur $S_8$ ($A_1$ symmetry species) |
| 246 | 248 | Rhombic Sulfur $S_8$ ($E_3$ symmetry species) |
| 435 | 437 | Rhombic Sulfur $S_8$ ($E_3$ symmetry species) |
| 472 | 474 | Rhombic Sulfur $S_8$ ($A_1$ (& $E_2$) symmetry species) |
| 1000 | 1003 | Polystyrene (v1 ring-breathing mode) |
| 1581 | 1581 | Polystyrene (ring stretching) |

FTIR spectra of various sulfur materials was generated. As shown in Table S2 below, both commercially obtained sulfur and nano-sulfur had peaks corresponding to those of rhombic sulfur species.

TABLE S2

FTIR peaks observed in different sulfur materials and the corresponding vibrations.

| Commercial sulfur ($cm^{-1}$) | Commercial polystyrene ($cm^{-1}$) | Nano sulfur ($cm^{-1}$) | Flexible sulfur wires ($cm^{-1}$) | Vibration |
|---|---|---|---|---|
| 439 | | 439 | | Rhombic Sulfur |
| 469 | | 469 | 468 | |

TABLE S2-continued

FTIR peaks observed in different sulfur materials and the corresponding vibrations.

| Commercial sulfur (cm$^{-1}$) | Commercial polystyrene (cm$^{-1}$) | Nano sulfur (cm$^{-1}$) | Flexible sulfur wires (cm$^{-1}$) | Vibration |
|---|---|---|---|---|
| 526 | | 528 | | |
| | 534 | | 538 | S—S—X bending/Polystyrene [$v_{6A}$ ($A_1$)] |
| 555 | | 554 | | Rhombic Sulfur |
| 589 | | 589 | | |
| 623 | | 623 | 621 | Rhombic Sulfur/Polystyrene [$v_{6B}$ ($B_1$)] |
| 658 | | 658 | | Rhombic Sulfur |
| 684 | | 684 | | |
| | 693 | | 695 | C—H bending (out-of-plane ring); Polystyrene [$v_{11}$ ($B_2$)] |
| 714 | | 714 | | Rhombic Sulfur |
| | 750 | | 747 | C—S stretch/Polystyrene [$v_{10B}$ ($B_2$)] |
| | 839 | | | |
| | | | 842 | Rhombic Sulfur |
| 848 | | 848 | | Rhombic Sulfur |
| | 905 | | 906 | Polystyrene [$v_{17B}$ ($B_2$)] |
| 908 | | 908 | | |
| 939 | | 939 | | Rhombic Sulfur |
| | 942 | | | |
| | 963 | | 964 | $C_\epsilon H_3$ (rocking) |
| | 979 | | 980 | CC stretch |
| | 1003 | | 1004 | n (CC) |
| | 1027 | | 1030 | C—C stretch; Polystyrene [$v_{18A}$ ($A_1$)] |
| | 1068 | | | |
| | 1112 | | | |
| | 1154 | | 1155 | $CH_2$ twist |
| | 1181 | | 1182 | $C_\beta H_2$ twist |
| | 1199 | | | |
| | 1281 | | | |
| 1303 | | 1303 | | Rhombic Sulfur |
| | 1312 | | 1312 | C—H bend |
| | 1328 | | 1329 | $CH_2$ twist |
| | 1346 | | | |
| | 1371 | | 1371 | C—H bend; Polystyrene [$v_{14}$ ($B_1$)] |
| 1428 | | | | |
| | 1451 | | 1451 | 1452: C—H deformation of $CH_2$ Polystyrene [$\delta(CH_2)$, $v_{19}$ ($B_1$)] |
| | 1492 | | 1492 | 1493: C—H stretching (ring in plane); Polystyrene [$v_{19A}$ ($A_1$)] |
| 1491 | | | | |
| | | | 1543 | C=C stretch in $C_4$; Polystyrene [$v_{11}$ + $v_{10A}$ = 1542] |
| | | | 1585 | 1583: C—H stretching (ring in plane); Polystyrene [$v_{9A}$ ($A_1$)] |
| | | | 1602 | 1601: C—C stretching (ring in plane); Polystyrene [$v_{9B}$ ($B_1$)] |
| | 1638 | | | |
| | 1666 | | 1672 | Polystyrene; $C_6S$ |
| | 1745 | | 1746 | Polystyrene; v2 C—C in $CS_4$ |
| | 1801 | | 1805 | Polystyrene; C—S |
| | 1869 | | 1872 | Polystyrene; v4 C—C in $SCS_4$ |
| | 1940 | | 1941 | C=C=C vibration; Polystyrene [$v_{17A}$ + $v_5$ = 1945] |
| | 2337 | | | |
| | 2847 | | 2848 | Polystyrene [$CH_2$ symmetric stretching] |

TABLE S2-continued

FTIR peaks observed in different sulfur materials and the corresponding vibrations.

| Commercial sulfur (cm$^{-1}$) | Commercial polystyrene (cm$^{-1}$) | Nano sulfur (cm$^{-1}$) | Flexible sulfur wires (cm$^{-1}$) | Vibration |
|---|---|---|---|---|
| | 2918 | | 2916 | C—H (asymmetrical stretching vibration of CH$_2$); Polystyrene [CH$_2$ asymmetric stretching] |
| | 2975 | | | |
| | 3002 | | | |
| | 3024 | | 3024 | C—H (aromatic stretch); Polystyrene [v'$_{20}$ (A$_1$)] |
| | 3059 | | 3058 | C—H (aromatic stretch); Polystyrene [v'$_2$ (A$_1$)] |
| | 3082 | | 3082 | C—H (aromatic stretch); Polystyrene [v$_{20B}$ (B$_1$)] |
| | 3103 | | | |
| | 3296 | | | |

The Flex-SW fibers have distinct peaks (538, 747, 1030, 1672, 1746, 1805, 1872 cm-1) that correspond to molecular vibrations characteristic of polystyrene, but are shifted from the commercial polystyrene material (as shown in FIG. 10) to the Flex-SW material, while other peaks are not. These peaks may be attributed to C—S bonds characteristic of the carbon-sulfur compounds. This indicates potential molecular bonding occurring between sulfur and carbon species in the polystyrene matrix. The C—S species in the Flex SWs, however, does not correspond to those of the carbon disulfide. The peaks in the FTIR spectrum may arise from the molecularly intimate polymer-sulfur co-existence likely occurring as a result of co-dissolution of the sulfur and polystyrene in the common solvent of carbon disulfide. The two compounds, however, retain their individual identities as evidence by the peaks in the Raman spectrum (as shown in Table S1). The bonding may result in slight deviations in vibrational frequencies from those reported for pure single phase rhombic sulfur and polystyrene in the FTIR and Raman spectra, which can be observed in a polymer blend.

Figure 11:
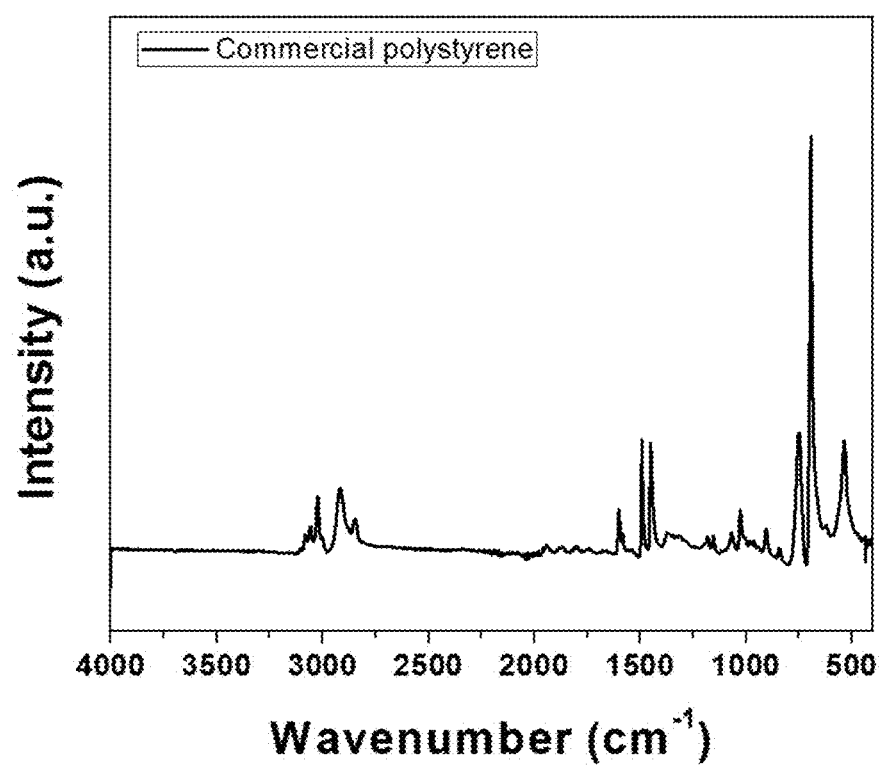
FIG. 11 is a FTIR spectrum of commercial polystryene used as a precursor in the synthesis of flexible sulfur wires, in accordance with certain embodiments of the invention.

Table S2 above shows various bond vibrations identified from the IR absorption spectra that was generated, and that of commercial polystyrene shown in FIG. 11. Peaks corresponding to rhombic sulfur are present in both commercial sulfur and nano-sulfur. Commercial sulfur has two unindexed peaks (1428, 1491 cm$^{-1}$) which are absent in the nano-sulfur material. Electrospun Flex-SW materials are seen to have peaks corresponding to rhombic sulfur and polystyrene. Indexing of certain peaks in the Electrospun Flex-SW material was difficult given that different databases had differing peaks corresponding to those of polystyrene. Certain peaks correlate with those of different C—S bond vibrations. Various carbon-carbon and carbon-sulfur bonds seen in carbon-chain molecules with sulfur termination i.e. C$_x$S (x=1-5) are seen therein. In addition, carbon-carbon vibrations seen in various other sulfur-carbon molecules SC$_x$S (x=1-5) are observed indicating the likely bond formation between the polymer and the sulfur species. The EDAX, Raman spectra however indicate that sulfur retains its molecular and chemical identity and the polymer bonding with sulfur is local rather than forming a new phase.

Figure 12:
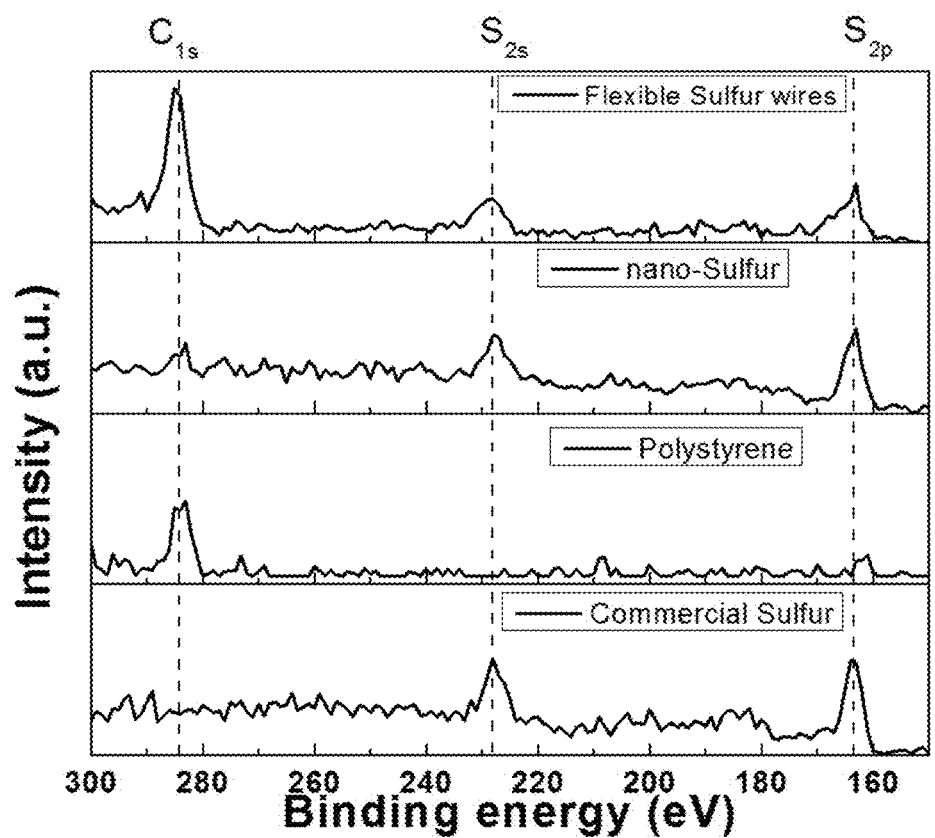
FIG. 12 is a XPS spectrum of the flexible sulfur wires, in accordance with certain embodiments of the invention, as well as nano-sulfur, commercial sulfur and polystyrene.

X-ray photoelectron spectroscopy analysis confirmed the existence of molecular sulfur with S2s and S2p3/2 values correlating closely with those reported in the literature. FIG. 12 and Table S3 below, show the binding energy values of various sulfur materials. As shown, nano-sulfur and. Flex-SWs have peak positions that are nearly identical to those of commercial sulfur.

TABLE S3

XPS peak positions in the various sulfur materials.

| | Peak positions (binding energy) | |
|---|---|---|
| Material | S$_{2s}$ (eV) | S$_{2p}^{3/2}$ (eV) |
| Flex- SWs | 228.19 | 163.09 |
| Nano-Sulfur | 227.66 | 163.09 |
| Commercial sulfur | 228.03 | 163.47 |

The charge-discharge profiles of the various sulfur cathode materials (10$^{th}$ cycle) including commercial sulfur, slurry cast commercial sulfur (C-Sulfur:slurry) and pellet-pressed commercial sulfur(C-Sulfur pellet); nano-sulfur pellet-pressed with a LIC layer (nano-Sulfur-LIC pellet); Flex-SWs with (Flex-SW pellet-LIC) and without a LIC layer (Flex-SW pellet) are shown in FIG. 4. Characteristic plateaus known to occur during the lithiation and de-lithiation of sulfur were observed in all the sulfur materials. Both the conversion of sulfur to long-chain polysulfides (~2.3 V) and the subsequent conversion of the same into dilithium sulfide (Li$_2$S) (~2.1 V) were observed in all the materials. Table 1 summarizes the initial capacity and approximate fade behavior of the various sulfur electrodes. It was observed that the commercial sulfur material when slurry cast had an initial capacity of ~766 mAh/g with a very rapid initial capacity drop of ~57% during the 1$^{st}$ five cycles. This large drop in capacity was expected due to the ubiquitous polysulfide formation occurring during lithiation and dissolution of the same without any efforts to retain the same at the sulfur cathode. This electrode thus continued to show polysulfide dissolution with retention of only ~4.8% of the initial capacity at the 60$^{th}$ cycle. The same commercially obtained sulfur material however, when pellet pressed as thick electrodes demonstrated 50% reduction in the fade rate. The thicker electrodes expectedly increased the diffusion path length and correspondingly increased the residence time of polysulfide closer to the electrode ensuring gradual conversion to the insoluble, dilithium sulfide. These electrodes were still directly exposed to the liquid solvent causing dissolution, thus resulting in gradual fade.

Flex-SW pellets on the other hand, demonstrated superior stability and minimal capacity fade over ~75 cycles. The Flex-SW pellet demonstrated an initial capacity of ~675 mAh/g which stabilized to ~450-500 mAh/g over the first 5 cycles. Furthermore, the Flex-SW pellet electrodes had exceptional stability with a fade rate of only ~0.17%/cycle which was comparable to other sulfur electrodes reported elsewhere (Table S3). The Flex-SW pellet electrodes had areal capacities of ~2.75 mAh/cm$^2$ at high current densities of ~0.6 mA/cm$^2$ which was almost twice that of other sulfur-based cathodes reported at comparable current densities. The flexible sulfur wires (Flex-SWs) also had stable capacities at different current rates, with negligible fade up to 135 cycles. There was, however, a drop in capacity as was expected with increasing current densities (because the polymer blended with the sulfur was not electronically conductive). Nevertheless, the current densities reported herein are unusually high for sulfur materials (current densities are typically from 0.1-0.7 mA/cm$^2$). These flexible sulfur wires with very unique yarn-like morphology thus have very high areal capacity (~2.75 mAh/cm$^2$) comparable to state-of-the art electrodes with equal or better stability. This superior stability may be a result of two effects: (a) physical spatial hindrance offered by the polymer coating, the sulfur preventing polysulfide seepage from the electrode to the sulfur and (b) existence of molecular-level mixing of polymer and sulfur with potentially local-bonding, which may result in tethered polysulfide species.

One unique feature of the Flex-SW pellet electrodes was an initial drop in capacity in the 1$^{st}$ cycle with subsequent stabilization by the 5$^{th}$ cycle. It may be that the initial lithiation to form polysulfides in the absence of the protective LIC results in dissolution of the surface sulfur species directly exposed to the liquid lithium electrolyte resulting in the initial drop followed by stabilization. Thus, LIC coated Flex-SW pellet electrodes were prepared using Li$_4$SiO$_4$ as the LIC material. The irreversible loss behavior seen in Flex-SW pellet electrodes was circumvented by the use of a thin LIC coating on the Flex-SW, wherein the Flex-SW-LIC pellet had an initial capacity of ~600-650 mAh/g exhibiting an initial loss of only ~5%. Protecting the electrodes using a very thin porous LIC layer ensured that sulfur was not directly exposed to liquid electrolyte while at the same time ensuring short lithium diffusion distances. Lithium orthosilicate (Li$_4$SiO$_4$) was chosen as the thin solid lithium-ion conducting (LIC) barrier layer since it previously demonstrated effective for the same, though conceivably any lithium ion conductor with good mechanical stability, small to medium pore size and minimal free volume within its lattice could be used for the same. This approach aided in improving the cycling stability as previously demonstrated for nano-sulfur electrodes (nano-Sulfur-LIC pellet-Table 1).

TABLE 1

Charge storage behavior of the various sulfur based electrodes.

| Material | Initial discharge capacity (mAh/g-S) | Initial capacity fade$^¥$ (% capacity) | Fade rate* (% capacity/cycle) |
|---|---|---|---|
| Commercial sulfur-slurry method (C-Sulfur:slurry) | 766.3 | 56.53 | 1.76 |
| Pellet-pressed commercial sulfur (C-Sulfur pellet) | 519.3$^†$ | N/A | 0.87 |
| Nano-sulfur pellet-pressed with an LIC layer (nano-Sulfur-LIC pellet) | 748.2$^†$ | N/A | 0.79 |
| Flex-SW pellet | 675.4 | 23.09 | 0.17 |
| Flex-SWs with LIC (Flex-SW pellet-LIC) | 620.3 | 5.37 | 0.003 |

$^¥$Fade rate calculated on the basis of 1$^{st}$ cycle capacity and 5$^{th}$ cycle capacity.
*Fade rate calculated on the basis of 5$^{th}$ cycle capacity and 55$^{th}$ cycle capacity.
$^†$Capacity reported at 5$^{th}$ cycle since there was an increase in capacity from 1$^{st}$ cycle due to gradual wetting of the electrode.

The orthosilicate LIC layer consisted of macroscopic particles fused together as a result of the mechanical pressing process consisting of macroscopic pores ideal for liquid electrolyte percolation. Short solid-state diffusion distances resulted and the common issues experienced in solid electrolyte based lithium-sulfur batteries were circumvented. The orthosilicate layer was a few microns thick ensuring that sulfur particles were not directly exposed to liquid electrolyte. The channel structure existing in the electrode ensured minimal percolation of liquid electrolyte to the sulfur particles. In addition to the protection offered by the orthosilicate layer, the pressing procedure ensured the formation of an elegant carbon coating on the sulfur particles and Flex-SWs. The carbon networks acted both as electron conduction and lithium ion conduction channels. Solid-state lithium ion diffusion through carbon was not sluggish and did not pose a barrier to intercalation and de-intercalation. The Flex-SW-LIC pellet had a very low fade rate of ~0.003%/cycle after the initial stabilization as compared to a fade rate of ~0.8%/cycle and 0.17%/cycle for the nano-Sulfur-LIC pellet and for the Flex-SW-pellet, respectively. This excellent cycling characteristic was a result of the superior stability of the Flex-SWs themselves and the added protection of the Flex-SW from the direct contact to the electrolyte provided by the LIC coating resulting in a stable areal capacity of 2.6 mAh/cm$^2$. Furthermore, the electrospun sulfur wires had a unique morphology amenable for flexible battery applications. The sulfur fibers generated can also be easily woven into a fabric to form a textile matt enabling the generation of a compliant, flexible electrode, which is a significant step in the creation of an all flexible battery. The synthesis method itself is easily scale-able rendering the materials all the more attractive. Additionally, the battery characteristics of this material are far superior to those of conventional lithium-ion battery cathodes and in fact, are better than or equal to known sulfur-based cathode materials (Table 2).

TABLE 2

Comparison of electrospun wires (Flex-SW pellet, Flex-SW-LIC pellet) with conventional lithium ion battery cathodes and sulfur cathodes.

| Material | Flex - SW pellet | Flex - SW - LIC pellet | Sulfur cathode | Conventional lithium battery cathodes |
|---|---|---|---|---|
| Gravimetric capacity (mAh/g-S) | 450-500 | 600-650 | 300-1200 | |
| Gravimetric capacity (mAh/g-active material) | ~100 | 150-200 | 200-400 | 150-225 |
| Areal capacity (mAh/cm$^2$) | 2-3 | 2-3 | 2- | 0.5-1 |
| Cycling fade rate (%/cycle) | 0.17 | 0.003 | 0.04-0.2 | 0.2 |

A dQ/dV plot was generated and characteristics of the Flex-SW pellet and Flex-SW-LIC-pellet electrodes during the $1^{st}$ cycle and the $60^{th}$ cycle, respectively, are shown in Table S4 below.

TABLE S4

Reaction potentials in dQ/dV plots of sulfur materials during the $1^{st}$ and $60^{th}$ cycle.

| | Discharge | | Charge | | |
|---|---|---|---|---|---|
| Cycle number | Reaction (i) voltage | Reaction (ii) voltage | Reaction (i) voltage | Reaction (ii) voltage | Reaction (iii) voltage |
| $1^{st}$ cycle | | | | | |
| Commercial sulfur-slurry method (C-Sulfur:slurry) | 2.335 | 2.06 | 2.306 | 2.459 | |
| Pellet-pressed commercial sulfur (C-Sulfur pellet) | 2.327 | 1.985 | 2.376 | 2.417 | |
| Nano-sulfur pellet-pressed with an LIC layer (nano-Sulfur-LIC pellet) | 2.155 | 2.013 | 2.288 | 2.403 | |
| Flex - SW pellet | 2.337 | 2.091 | 2.26 | 2.363 | |
| Flex - SWs with LIC (Flex - SW pellet-LIC) | 2.128 | 1.901 | 2.309 | 2.418 | |
| $60^{th}$ cycle | | | | | |
| Commercial sulfur-slurry method (C-Sulfur:slurry) | 2.348 | 1.95 | 2.377 | 2.485 | |
| Pellet-pressed commercial sulfur (C-Sulfur pellet) | 2.320 | 2.032 | 2.29 | 2.42 | 2.541 |
| Nano-sulfur pellet-pressed with an LIC layer (nano-Sulfur-LIC pellet) | 2.29 | 1.996 | 2.315 | 2.439 | |
| Flex-SW pellet | 2.333 | 2.081 | 2.250 | 2.373 | |
| Flex - SWs with LIC (Flex - SW pellet-LIC) | 2.279 | 1.997 | 2.323 | 2.446 | |

Characteristic peaks were observed centered around ~2.3 V (see Table S4) in the $1^{st}$ discharge profile Flex-SW pellet material corresponding to the conversion of sulfur to soluble long-chain lithium polysulfides ($Li_2S_n$, $4 \leq n \leq 8$). In addition, conversion of polysulfide species to dilithium sulfide was observed around ~2.1 V. These voltages corresponded closely to those observed in the charge-discharge profiles in FIG. 4. Cathodic peak positions in the $1^{st}$ discharge were shifted by ~200 mV may be as a result of increased resistance resulting from the presence of the LIC coating material in the Flex-SW-LIC pellet materials. This was indicative of an increased resistance to lithiation occurring as a result of the LIC potentially contributing to the ~8% drop in the $1^{st}$ cycle capacity between the Flex-SW material and the Flex-SW-LIC material (see Table 1). This over-potential present in the Flex SW-LIC material in the $1^{st}$ cycle dropped to <100 mV in the subsequent cycles compared to Flex-SW pellet electrodes (see Table S5) indicating that this initial barrier to lithiation was pronounced only in the $1^{st}$ cycle. The over-potential effects were more invariable, however, in the charge cycle of the Flex-SW-LIC pellet material with ~100 mV difference between charge peaks as compared to Flex-SW pellet material. Table S5 below delineates peak potentials during charge and discharge in the Flex-SW pellet and Flex-SW-LIC pellet materials.

TABLE S5

Reaction voltages in dQ/dV plots of Flex - SW, Flex - SW-LIC pellets.

| | Discharge | | Charge | |
|---|---|---|---|---|
| Cycle number | Reaction (i) voltage | Reaction (ii) voltage | Reaction (i) voltage | Reaction (ii) voltage |
| Flex - SW pellet | | | | |
| $1^{st}$ cycle | 2.337 | 2.091 | 2.26 | 2.363 |
| $2^{nd}$ cycle | 2.333 | 2.079 | 2.255 | 2.356 |

TABLE S5-continued

Reaction voltages in dQ/dV plots of Flex - SW, Flex - SW-LIC pellets.

| | Discharge | | Charge | |
|---|---|---|---|---|
| Cycle number | Reaction (i) voltage | Reaction (ii) voltage | Reaction (i) voltage | Reaction (ii) voltage |
| $3^{rd}$ cycle | 2.237 | 2.057 | 2.285 | 2.401 |
| $4^{th}$ cycle | 2.308 | 2.051 | 2.276 | 2.391 |
| $5^{th}$ cycle | 2.314 | 2.072 | 2.269 | 2.38 |
| $60^{th}$ cycle | 2.333 | 2.081 | 2.250 | 2.373 |

TABLE S5-continued

Reaction voltages in dQ/dV plots of
Flex - SW, Flex - SW-LIC pellets.

| | Discharge | | Charge | |
|---|---|---|---|---|
| Cycle number | Reaction (i) voltage | Reaction (ii) voltage | Reaction (i) voltage | Reaction (ii) voltage |
| | Flex - SW-LIC pellet | | | |
| $1^{st}$ cycle | 2.128 | 1.901 | 2.309 | 2.418 |
| $2^{nd}$ cycle | 2.285 | 2.021 | 2.32 | 2.416 |
| $3^{rd}$ cycle | 2.298 | 2.025 | 2.316 | 2.417 |
| $4^{th}$ cycle | 2.296 | 2.025 | 2.312 | 2.415 |
| $5^{th}$ cycle | 2.296 | 2.031 | 2.31 | 2.413 |
| $60^{th}$ cycle | 2.279 | 1.997 | 2.323 | 2.446 |

This observation was further corroborated by the Nyquist plot obtained by performing electrochemical impedance spectroscopy (EIS), wherein it was seen that the overall impedance of the Flex-SW pellet material was lower than that of the Flex-SW-LIC material before cycling. Modeling the impedance spectra using the known Randle's circuit model, the charge transfer parameters were obtained for both the materials before and after cycling and are listed in Table S6.

TABLE S6

Charge transfer parameters before and after cycling, Flex-SW, Flex-SW-LIC.

| Material | $R_s$ (ohm-cm$^2$) | $CPE_i$ T(*10$^6$) | P | $R_i$ (ohm-cm$^2$) | $CPE_{dl}$ T(*10$^5$) | P | $R_{ct}$ (ohm-cm$^2$) | Wo R | T(*10$^8$) | P |
|---|---|---|---|---|---|---|---|---|---|---|
| | | | | Before cycling | | | | | | |
| Flex-SW pellet | 8.84 | 5.9 | 0.81 | 71.7 | 23.4 | 1.06 | 4.1 | 0.02 | 1.33 | 0.20 |
| Flex-SW-LIC pellet | 9.36 | 10.4 | 0.86 | 132.1 | 2.0 | 0.73 | 33.6 | 0.03 | 0.02 | 0.15 |
| | | | | After cycling | | | | | | |
| Flex-SW pellet | 17.74 | 40.6 | 0.68 | 11.2 | 87.4 | 0.65 | 24.1 | 5.49E-07 | 217.79 | 0.72 |
| Flex-SW-LIC pellet | 21.32 | 17.3 | 0.72 | 51.7 | 3.1 | 0.94 | 15.8 | 1.14 | 0.61 | 0.16 |

The EIS model used a simple double layer ($R_{ct}$, $CPE_{dl}$) in series with an interfacial R—C element ($R_i$, $CPE_i$) and series resistance ($R_s$). It was seen that the interfacial resistance of the Flex-SW-LIC pellet material was almost 60 ohm-cm$^2$ higher than that of the Flex-SW material before cycling. There was a significant decrease in the same, however, with cycling reflecting the trends seen in the reaction potentials in the dQ/dV plots (Table S4). There was also seen an interesting contrast in the charge-transfer values before and after cycling, wherein the Flex-SW-LIC pellet materials exhibited a decrease while the Flex-SW pellets had an opposite trend. This contrast may be occurred as the result of the presence of the LIC layer. In the case of the unprotected Flex-SW pellet material, the liquid electrolyte expectedly percolated through the polymer and existed in a soup-like state with concentration varying with cycling. The soup consisted of the expected polysulfides dissolved in solution causing sluggish tunneling (the local concentration of dissolved polysulfides may also lead to a Le Chatelier-type hindrance to further reaction resulting in an increase in charge transfer resistance). In the case of the Flex-SW-LIC pellet material, the conversion of sulfur to lithium disulfide may be occurred in the solid state resulting in a higher interfacial resistance than the Flex-SW pellet but having more facile kinetics than the same. Both materials cycled stably, however, barring the initial drop in capacity in the Flex-SW pellet material occurring as a result of the exposed sulfur on the surface.

The unique flexible sulfur wires derived by the electrospinning procedure possessed remarkably superior electrochemical characteristics, which are uncharacteristic of other sulfur cathodes used in lithium-sulfur batteries. Intimate contact between sulfur and the polymer and superior polysulfide containment by the lithium ion conductor (LIC) coating resulted in a very low cycling fade rate (~0.003%), as well as stable cycling over extended cycling. This phenomenon was a result of shielding and potentially local-bonding, likely offered by both the polymer coating as well as the LIC membrane. Another unique characteristic of the Flex-SW-LIC pellet morphology was the rapid circumventing of the initial over-potential effects observed in the $1^{st}$ cycle (as evidenced by the shift in lithiation potentials shown in Table S6 and decrease in both interfacial and charge transfer resistance shown in Table 3) indicative of a material wherein the LIC coating served the purpose of increasing stability while not causing additional resistive effects and limiting charge-storage capability.

CONCLUSIONS OF EXAMPLES

Flexible sulfur wires (Flex SW) with a unique yarn-like morphology amenable for fabricating flexible textile-like cathodes were prepared using a simple electrospinning procedure from pure viscous sulfur solutions. The battery characteristics of these Flex-SWs were evaluated by making pelleted electrodes with conductive carbon additives. The polymer used in the spinning procedure also acted as a binder in the pressing procedure. Moreover, the spinning procedure resulted in the existence of sulfur and polymer in close proximity causing the blend-like material with superior cycling capability. Areal capacities of ~2.75 mAh/cm$^2$ with excellent stability up to 135 cycles was observed. An initial drop in capacity was observed in these as-generated Flex-SW pellet electrodes, which was overcome by introducing a lithium ion conducting layer on top of the Flex-SW pellet. Such Flex-SW-LIC pellets were shown to have stable capacities of ~620 mAh/g with an unprecedented and exceptionally low fade rate of 0.003%/cycle. It was shown that the LIC coating resulted in a slight increase in interfacial resistance, though its effect was observed to shift reaction potentials only in the 1st discharge cycle. The fabrication of such unique flexible or shape conforming electrode materials can provide for the fabrication of flexible batteries suitable to align to the shape and conformation of various shape changing devices tailored to conserve real estate and add new dimensions to portability.

The invention claimed is:

1. A sulfur-polymer composite, comprising:
   a plurality of sulfur wires, comprising:
      an exterior layer;
      an interior layer;
      a diameter from about 1-7 μm, derived from an electrospinning precursor solution, the precursor solution comprising:
         from 30 to 75% by weight based on total weight of the solution of a sulfur component, selected from the group consisting of sulfur powder, nano-sulfur powder, and mixtures thereof; and
   a conducting polymer selected from the group consisting of polystyrene, polythiophene, polypyrrole, polyacrylamide, and polyvinylidene fluoride,
   wherein the sulfur-polymer composite includes the plurality of sulfur wires interwoven with the conducting polymer or the conducting polymer forms an exterior layer and the sulfur wires form an interior layer; and
   a lithium ion conducting coating applied to the sulfur-polymer composite.

2. The composite of claim 1, wherein said plurality of electrospun sulfur wires has a continuous length from about 12 inches to about 24 inches.

3. The electrospun sulfur-polymer composite of claim 1, wherein the sulfur component consists of the sulfur powder and the polymer component consists of polystyrene.

4. A sulfur-polymer mat, comprising:
   a plurality of electrospun sulfur-polymer wires having a diameter from about 1-7 μm, derived from an electrospinning precursor solution, the precursor solution comprising:
      a mixture, comprising:
         from 30 to 75% by weight based on total weight of the solution of sulfur selected from the group consisting of sulfur powder, nano-sulfur powder, and mixtures thereof; and
      a solvent; and
   a conducting polymer selected from the group consisting of polystyrene, polythiophene, polypyrrole, polyacrylamide, and polyvinylidene fluoride;
   wherein, the plurality of electrospun sulfur-polymer wires are in a stacked form such that at least two layers of electrospun sulfur-polymer wires are in an alternating configuration with at least two layers of conducting polymer throughout the stacked form.

5. The electrospun sulfur-polymer mat of claim 4, wherein the sulfur component consists of the sulfur powder and the polymer component consists of polystyrene.

* * * * *